US007657590B2

(12) United States Patent
Reading et al.

(10) Patent No.: US 7,657,590 B2
(45) Date of Patent: Feb. 2, 2010

(54) LOAD BALANCING SYSTEM AND METHOD

(75) Inventors: Jason Albert Reading, London (GB);
David Morris, Guildford (GB)

(73) Assignee: UBS AG, Zurich (CH)

( * ) Notice: Subject to any disclaimer, the term of this patent is extended or adjusted under 35 U.S.C. 154(b) by 723 days.

(21) Appl. No.: 10/055,100

(22) Filed: Jan. 22, 2002

(65) Prior Publication Data

US 2002/0178037 A1 Nov. 28, 2002

Related U.S. Application Data

(60) Provisional application No. 60/267,185, filed on Feb. 7, 2001.

(51) Int. Cl.
*G06F 15/16* (2006.01)

(52) U.S. Cl. ............... 709/201; 709/217; 709/218; 709/219; 709/223; 709/225; 705/7; 705/8

(58) Field of Classification Search ............... 709/201, 709/217–219, 223–225, 232, 248; 705/7, 705/8
See application file for complete search history.

(56) References Cited

U.S. PATENT DOCUMENTS

| | | | | | |
|---|---|---|---|---|---|
| 5,522,070 | A | * | 5/1996 | Sumimoto | 718/104 |
| 5,627,764 | A | * | 5/1997 | Schutzman et al. | 709/207 |
| 5,634,127 | A | * | 5/1997 | Cloud et al. | 719/313 |
| 5,666,490 | A | * | 9/1997 | Gillings et al. | 709/238 |
| 5,754,857 | A | * | 5/1998 | Gadol | 709/203 |
| 5,819,022 | A | * | 10/1998 | Bandat | 714/16 |
| 5,826,239 | A | * | 10/1998 | Du et al. | 705/8 |
| 5,870,545 | A | * | 2/1999 | Davis et al. | 709/201 |
| 5,878,398 | A | * | 3/1999 | Tokuda et al. | 705/8 |
| 5,881,238 | A | * | 3/1999 | Aman et al. | 709/226 |
| 5,918,226 | A | * | 6/1999 | Tarumi et al. | 707/10 |
| 5,937,388 | A | * | 8/1999 | Davis et al. | 705/8 |
| 5,948,065 | A | | 9/1999 | Eilert et al. | 709/226 |
| 5,987,422 | A | * | 11/1999 | Buzsaki | 705/9 |
| 6,041,306 | A | * | 3/2000 | Du et al. | 705/8 |
| 6,073,109 | A | * | 6/2000 | Flores et al. | 705/8 |
| 6,073,111 | A | * | 6/2000 | Leymann et al. | 705/8 |
| 6,078,982 | A | * | 6/2000 | Du et al. | 710/200 |

(Continued)

OTHER PUBLICATIONS

International Search Report dated Jun. 5, 2002 for PCT/US02/03350.

*Primary Examiner*—Hassan Phillips
*Assistant Examiner*—Backhean Tiv
(74) *Attorney, Agent, or Firm*—Proskauer Rose LLP

(57) ABSTRACT

A workflow is processed by plurality of activity servers, each of the plurality of activity servers performing at least one of a plurality of activities. In step a, a workflow packet requiring one of the plurality of activities to be executed is retrieved from a workflow queue. In step b, the activity is executed by the one of the plurality of activity servers. In step c, a next activity to be performed is determined based on workflow transition information. In step d, the next activity is executed if the one of the plurality of activity performs the next activity. In step e, the next activity is forwarded to the workflow queue if the one of the plurality of activities does not perform the activity. Steps a-e are repeated until all of the plurality of activities in the workflow are executed.

35 Claims, 5 Drawing Sheets

U.S. PATENT DOCUMENTS

| | | | |
|---|---|---|---|
| 6,088,679 A * | 7/2000 | Barkley | 705/8 |
| 6,122,633 A * | 9/2000 | Leymann et al. | 707/10 |
| 6,151,583 A * | 11/2000 | Ohmura et al. | 705/8 |
| 6,247,056 B1 | 6/2001 | Chou et al. | 709/229 |
| 6,253,369 B1 * | 6/2001 | Cloud et al. | 717/136 |
| 6,275,846 B1 * | 8/2001 | Kondo et al. | 709/200 |
| 6,278,977 B1 * | 8/2001 | Agrawal et al. | 705/7 |
| 6,308,163 B1 * | 10/2001 | Du et al. | 705/8 |
| 6,334,114 B1 | 12/2001 | Jacobs et al. | 705/26 |
| 6,397,191 B1 * | 5/2002 | Notani et al. | 705/9 |
| 6,397,192 B1 * | 5/2002 | Notani et al. | 705/9 |
| 6,401,073 B1 * | 6/2002 | Tokuda et al. | 705/8 |
| 6,442,594 B1 * | 8/2002 | Ouchi | 709/206 |
| 6,449,646 B1 * | 9/2002 | Sikora et al. | 709/226 |
| 6,463,346 B1 * | 10/2002 | Flockhart et al. | 700/102 |
| 6,539,404 B1 * | 3/2003 | Ouchi | 715/500 |
| 6,578,159 B1 * | 6/2003 | Kitagawa et al. | 714/15 |
| 6,687,241 B1 * | 2/2004 | Goss | 370/352 |
| 6,772,407 B1 * | 8/2004 | Leymann et al. | 717/100 |
| 6,901,425 B1 * | 5/2005 | Dykes et al. | 709/203 |
| 6,952,718 B2 * | 10/2005 | Nakamura et al. | 709/205 |
| 7,237,199 B1 * | 6/2007 | Menhardt et al. | 715/736 |
| 2002/0035606 A1 * | 3/2002 | Kenton | 709/206 |
| 2002/0077842 A1 * | 6/2002 | Charisius et al. | 705/1 |
| 2003/0101133 A1 * | 5/2003 | DeFrancesco et al. | 705/38 |
| 2003/0200527 A1 * | 10/2003 | Lynn et al. | 717/102 |
| 2006/0053425 A1 * | 3/2006 | Berkman et al. | 719/313 |
| 2007/0208606 A1 * | 9/2007 | Mackay et al. | 705/9 |

* cited by examiner

FIG. 2       PRIOR ART

LOAD BALANCING SYSTEM AND METHOD

CROSS REFERENCE TO RELATED APPLICATIONS

This application claims priority of U.S. provisional patent application No. 60/267,185 filed Feb. 7, 2001.

BACKGROUND

The following invention relates to workflows and, in particular, to a system and method for distributing workflow activities across multiple activity servers.

Workflow process management automates the flow of work through an organization to accomplish business tasks. In order to apply workflow process management to automate business tasks, the business tasks are modeled as workflow processes that include a coordinated set of process activities that are connected in order to accomplish the particular business task. Each process activity is a logical step or description of a piece of work that is part of the business task and can be a manual activity and/or an automated activity. By executing the activities associated with a particular workflow process, the corresponding business task is performed. See, for example, Workflow: An Introduction, by Rob Allen of Open Image System Inc., (http://www.wfmc.org/standards/docs/Workflow_An_Introduction.pdf)

Workflow process management techniques are useful for streamlining the execution of business tasks. By defining various elemental activities that are used in solving business tasks, a workflow process designer can use these activities to specify a workflow for solving a particular business task. Also, because many of the activities are common to different workflows, the task of specifying a workflow process to solve a business problem is often simplified.

Executing a workflow process typically entails writing computer software that performs the automated activities and provide an interface mechanism for receiving manual instructions for manual activities. By executing on a computer system the computer software associated with the activities of a particular workflow in the order defined by that workflow, the particular workflow process is executed and the corresponding business task is performed.

Although workflow management techniques simplify the definition and execution of business tasks, the use of these techniques gives rise to certain problems. For example, in a system that executes multiple workflows simultaneously, it may often occur that several workflows require access to the same activity in order to complete its execution thereby creating a bottleneck that will adversely affect system performance. Also, certain activities that are maintained by the computer system(s) executing the workflows may be infrequently used and, as a result, system resources are wasted. In addition, the execution of a first workflow that shares certain activities with a second workflow may become blocked by the second workflow that is waiting for a user response to a manual activity request. Thus, the benefits of applying workflow management techniques is limited by the ability to distribute and execute different activities in a shared environment and across multiple servers.

Various prior art techniques exist for load balancing workflow activities across system resources. Referring now to FIG. 1, there is shown a block diagram of a prior art "free-for-all" system 10 for distributing workflow activities. System 10 includes a plurality of activity servers 11 each of which perform a certain number of activities. Also included is a database 12 that stores the activities to be performed for executing various workflows. Each of activity servers 11 competes for work by polling database 12 for activities that they can process.

A drawback of this approach is that each time one of activity servers 11 obtains work from database 12, it must lock database 12 thereby creating contention between activity servers 11 accessing database 12. Furthermore, because each of activity servers 11 acts in isolation and is unaware of the workload being performed by the others of activity servers 11, it is cumbersome for allocate the activities of a workflow across several of activity servers 11. In addition, in the free-for-all approach, it is difficult to implement a strategy for distributing activities across activity servers 11.

Referring now to FIG. 2, there is shown a block diagram of a system 20 in which a resource manager 21 retrieves activities from database 12 and allocates the activities to the appropriate one of activity servers 11. While system 20 may reduce contention to database 12 because only resource manager 21 locks database 12, resource manager 21 itself is a single point of failure and may become a performance bottleneck.

Accordingly, it is desirable to provide a system and method for distributing workflow activities across multiple activity servers.

SUMMARY OF THE INVENTION

The present invention is directed to overcoming the drawbacks of the prior art. Under the present invention a method for processing a workflow, the workflow including a plurality of activities and workflow transition information. The workflow is processed by a plurality of activity servers where each of the plurality of activity servers performing at least one of the plurality of activities. The method, in step a, retrieves from a workflow queue a workflow packet requiring one of the plurality of activities to be executed wherein the workflow packet is retrieved by one of the plurality of activity servers performing the one of the plurality of activities. Next, in step b, the activity is executed by the one of the plurality of activity servers. Next, in step c, a next activity to be performed is determined based on the workflow transition information. Next, in step d, the next activity is executed if the one of the plurality of activities performs the next activity. Next, in step e, the next activity is forwarded to the workflow queue if the one of the plurality of activities does not perform the activity. Finally, steps a-e are repeated until all of the plurality of activities in the workflow are executed.

In an exemplary embodiment, the workflow packet includes a process state.

In another exemplary embodiment, a database for storing said transition information is included and the method includes the step of retrieving the transition information from the database wherein the transition information is retrieved by all of the plurality of activity servers.

In yet another exemplary embodiment, the step of forwarding to the workflow queue includes the steps of forming a next workflow packet requiring the next activity and the next process state and forwarding the next workflow packet to the workflow queue.

In still yet another exemplary embodiment, at least one of the plurality of activity servers performs more than one of the plurality of activities.

In an exemplary embodiment, at least one of the plurality of activities is an automatic activity.

In another exemplary embodiment, at least one of the plurality of activities is a manual activity for receiving an input from a user.

In yet another exemplary embodiment, the manual activity manages a user interface with the user.

In still yet another exemplary embodiment, more than one of the plurality of activities is a manual activity and wherein the more than one of the plurality of activities are aggregated in one of the plurality of activity servers.

In an exemplary embodiment, the one of the plurality of activity servers interfaces with a desktop server for providing a user interface to a user.

In another exemplary embodiment, at least one of the plurality of activities is performed by more than one of the plurality of activity servers.

In yet another exemplary embodiment, the method includes the steps of receiving an event notification requesting that the workflow be processed and initiating said workflow.

Under the present invention, a system is provided for processing a workflow is wherein the workflow includes a plurality of activities and workflow transition information. The system includes a database for storing said workflow transition information. Also included is a workflow queue for storing a plurality of workflow packets requiring at least one of the plurality of activities. A plurality of activity servers is also included in which each of the plurality of activity servers perform at least one of the plurality of activities. Each of the plurality of activity servers include a workflow engine for receiving the workflow transition information from the database. Also included is a plurality of resource managers wherein each of the plurality of activity servers includes one of the plurality of resource managers. Each of the plurality of resource managers retrieves from the workflow queue at least one of the plurality of workflow packets requiring execution by one of the plurality of activities provided by the corresponding activity server. Also, each of the plurality of resource managers determines a next activity to be performed in the workflow based on the transition information. Finally, each of the plurality of resource managers forwards to the workflow queue the next activity if the corresponding one of the plurality of activity servers does not perform the next activity.

In an exemplary embodiment, each of the plurality of resource managers takes the workflow packet requiring the next activity and the next process state and forwards the workflow packet to the workflow queue for one of the plurality of activity servers providing said next activity.

In another exemplary embodiment, the system includes an event receiver for receiving an event notification for initiating the workflow.

Under the present invention, computer executable program code residing on a computer-readable medium is provided wherein the program code comprises instructions for causing the computer to perform a method for processing a workflow, the workflow including a plurality of activities and workflow transition information, the workflow being processed by a plurality of activity servers, each of the plurality of activity servers performing at least one of the plurality of activities. In step a, the program code causes the computer to retrieve from a workflow queue a workflow packet requiring one of the plurality of activities to be executed, the workflow packet being retrieved by one of the plurality of activity servers performing the one of the plurality of activities. In step b, the program code causes the computer to execute the activity by the one of the plurality of activity servers. In step c, the program code causes the computer to determine a next activity to be performed based on the workflow transition information. In step d, the program code causes the computer to execute the next activity if the one of the plurality of activities performs the next activity. In step e, the program code causes the computer to forward to the workflow queue the next activity if the one of the plurality of activities does not perform the activity. Finally, the program code causes the steps a-e to be repeated until all of the plurality of activities in the workflow are executed.

In an exemplary embodiment, the computer executable program includes a database for storing the transition information, and wherein the program code additionally causes the computer to retrieve the transition information from the database, the transition information being retrieved by all of the plurality of activity servers.

In another exemplary embodiment, the program code additionally causes the computer to form a next workflow packet requiring the next activity and the next process state and forward the next workflow packet to the workflow queue.

In yet another exemplary embodiment, the program code additionally causes the computer to receive an event notification requesting that the workflow be processed and initiate the workflow.

Accordingly, a method and system is provided for distributing workflow activities across multiple activity servers.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which.

DETAILED DESCRIPTION OF THE PREFERRED EMBODIMENTS

Figure 3:
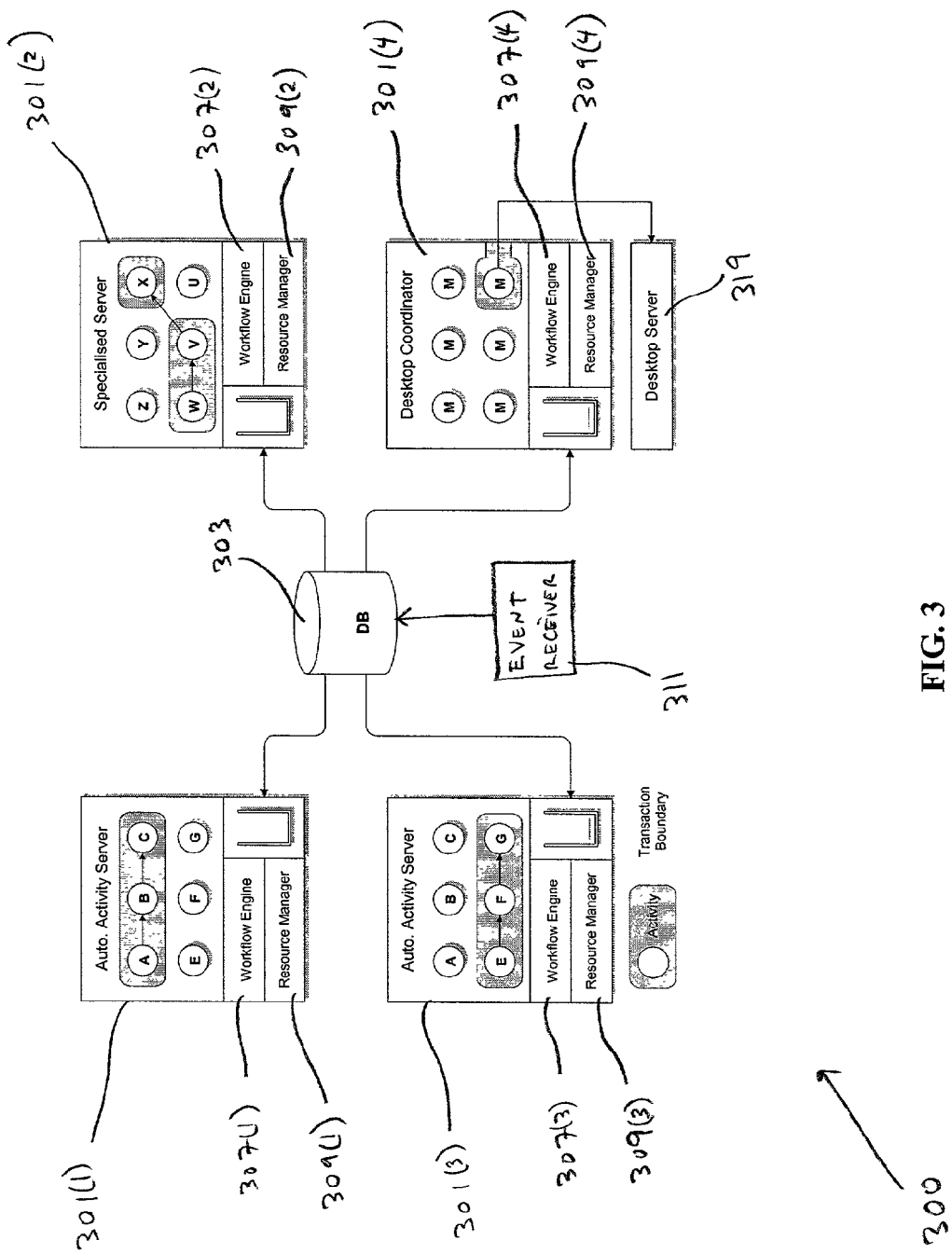
FIG. 3 is a block diagram of a system for executing activities associated with a workflow process, in accordance with the present invention.

Referring now to FIG. 3, there is shown a block diagram of a system 300 for executing activities associated with a workflow process, in accordance with the present invention. System 300 includes a plurality of activity servers 301 for executing the workflow activities wherein each of activity servers 301 performs at least one of the activities. In the exemplary embodiment of FIG. 3, activity servers 301 perform the activities required to execute the following workflow:

$$\{A\text{->}B\text{->}C\}\text{->}\{W\text{->}V\}\text{->}\{X\}\text{->}\{M\}\text{->}\{E\text{->}F\text{->}G\} \quad (3)$$

wherein each letter represents a particular activity and the braces define a transaction of activities. For example, activities A, B and C may be InstantiateTrade, DetermineValidDealType, UpdateConfirmationand the transaction of $\{A\text{->}B\text{->}C\}$ results in the net effect of these activities.

In the embodiment of FIG. 3, activity server 301(1) is configured to perform activities A, B, C, E, F, and G with activities A, B and C forming a single transaction. Activity server 201(2) is configured to perform activities Z, Y, X, W, V and U with activities W and V constituting a transaction and activity X constituting a transaction. A transaction may consist of a number of activities and may be based on any consideration including, by way of non-limiting example, the business objects that are being manipulated, the availability of the next activity to be invoked and the providing of transactional integrity.

Activity server 301(3) is configured to perform the same activities as activity server 301(1). One reason for including in system 300 activity server 301(3) that performs the same activities as activity server 301(1) is that if a first workflow requires repeated access to any of those activities, such access does not become a bottleneck for other workflows that also need access to such activities. Alternatively, if it is determined that a particular activity is common to many workflows and therefore will be executed often, that activity may be included in numerous of activity servers 301. In addition, a particular activity server may be configured solely to perform numerous instances of that activity in order to meet the demand for that activity. Thus, activity servers 301 may be configured in any desirable way to meet the requirements of any workflow.

Activity server 301(4) is configured to perform numerous instances of activity M. In this embodiment, activity M is a manual activity that interacts with a user in any way such as, by way of non-limiting example, by causing the display of an input screen requesting a data value from a user that is necessary for completing the workflow process and receiving that data value from the user. In an exemplary embodiment, activity server 301(4) interfaces with a desktop server 319 that includes the necessary software and hardware for displayed any desired user interface and receiving any data input from the user.

In the embodiment of FIG. 3, all the manual activities required the particular workflow are placed into a single one of activity servers 301. An advantage of placing all manual activities into a single one of activity servers 301 is that the other of activity servers 301 that do not the perform manual activities do not therefore have to wait idly for the user input in and are thus free to execute other workflow activities. Thus, by configuring an activity server to execute all manual activities, such as activity server 301(4), a single activity can manage all user interactions thereby improving the performance of the other of activity servers 301 that perform automatic activities.

Although in the embodiment in FIG. 3 activity server 301 (4) performs all of the manual activities, manual activities could be provided by any of activity servers 301. The distribution of manual activities across multiple activity servers 301 or the aggregation of manual activities in a dedicated one of activity servers 301 has no bearing upon the load balancing mechanism of the present invention that simply sends a workflow packet to one of activity servers 301 that provides the next activity required.

In an exemplary embodiment, each of activity servers 301 is comprised of a multithreaded software program that is capable of executing more that one activity simultaneously. Activity servers could be written in any of a plurality of programming languages. Furthermore, the load balancing mechanism of the present invention may be applied even if all of activity servers 301 are not written in the same programming language. In a preferred embodiment, activity servers 301 are written in C++ and Java. In an exemplary embodiment, multiple activity servers 301 run on a single server platform such as, by way of non-limiting example, a suitably configured personal computer. Alternatively, a single one of (or each of) activity servers 301 may run on a server platform. For example, if a particular one of activity servers 301 performs activities that require significant processing capabilities, then it may be desirable to dedicate a server platform to run that particular one of activity servers 301. Furthermore, if it is determined that the performance of a particular server platform has degraded as a result of the number of activity servers 301 that are executing thereon, then a new server platform may be added to system 300 for executing some of activity servers 301 thereby alleviating the burden on the existing server platform.

System 300 also includes a workflow database 303 for storing information regarding each workflow process supported by system 300. In particular, each workflow is defined by the activities required to perform the workflow and the transitional information between the activities. As described below, the transitional information is used by each of activity servers 301 as a road map for performing the activities required to complete the workflow process.

Each of activity servers 301 includes a workflow engine 307 that is in communication with workflow database 303 for receiving the transitional information contained therein. For example, in the workflow example provided above, the transitional information between activities A, B, C, W etc. stored in workflow database 303 is received by workflow engine 307 so that each of activity servers 301 knows the sequence of and conditions required to execute any of the workflow activities. Thus, after activity server 301(1) performs activity A, activity server 301(1) executes activity B based on the transitional information of A->B contained in workflow engine 307. Similarly, after activity server 301(1) performs activity C, activity server 301(1) is aware that the next activity to be performed is activity W that must be performed by another one of activity servers 301.

For example, listed below in Table 1 is an exemplary embodiment of a transition table for a particular workflow process in which each line includes transition information that workflow engines 307 receives from workflow database 303. Each transition line in the transition table includes a route number that identifies the particular workflow process the transition line is associated with. In the embodiment included in Table 1, all of the transition lines are associated with the same workflow process (as indicated by the identical route number). In an exemplary embodiment, a transition table may include transition lines having different route numbers in which case all of the transition lines having the same route number would be part of the same workflow process.

Figure 1:
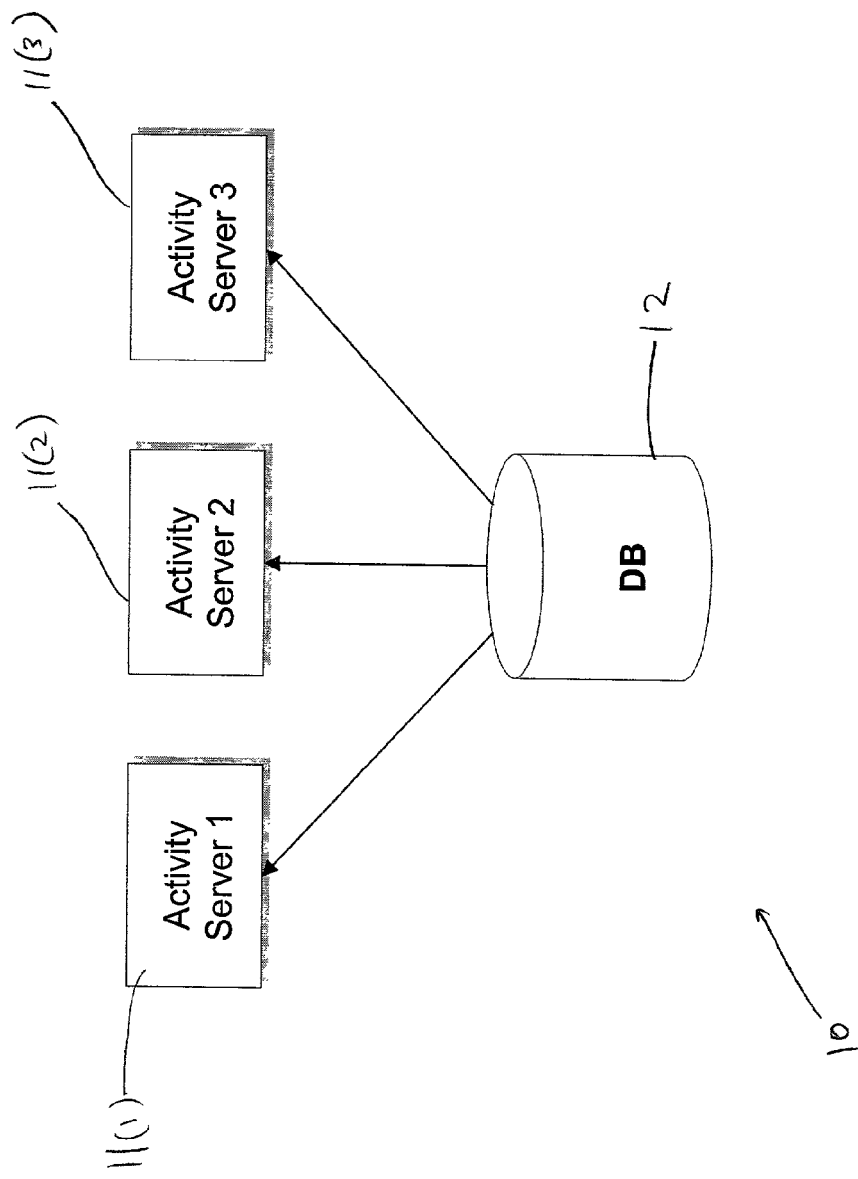
FIG. 1 is a block diagram of a prior art system for distributing workflow activities.
Figure 2:
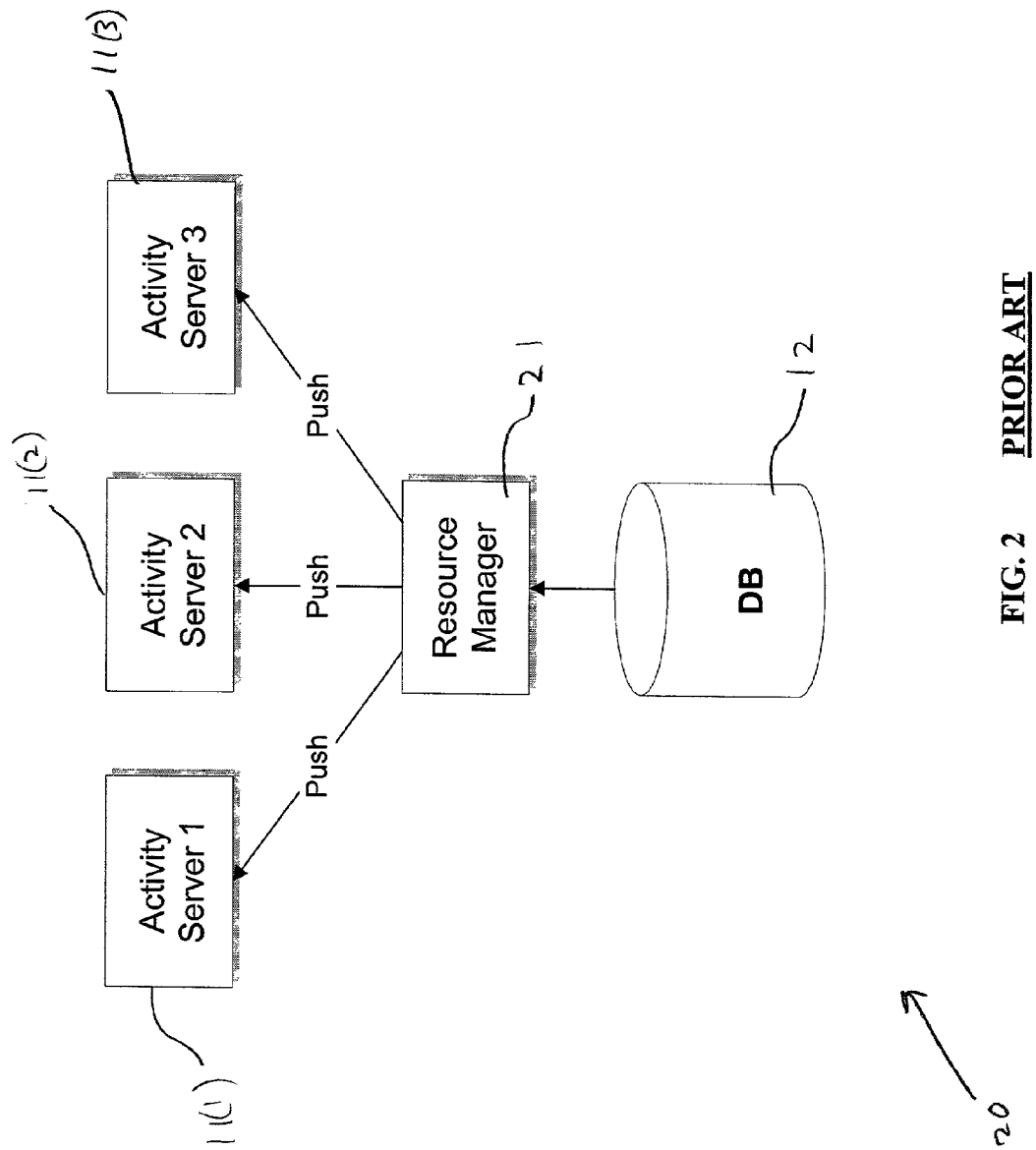
FIG. 2 is a block diagram of another prior art system for distributing workflow activities.
Figure 5:
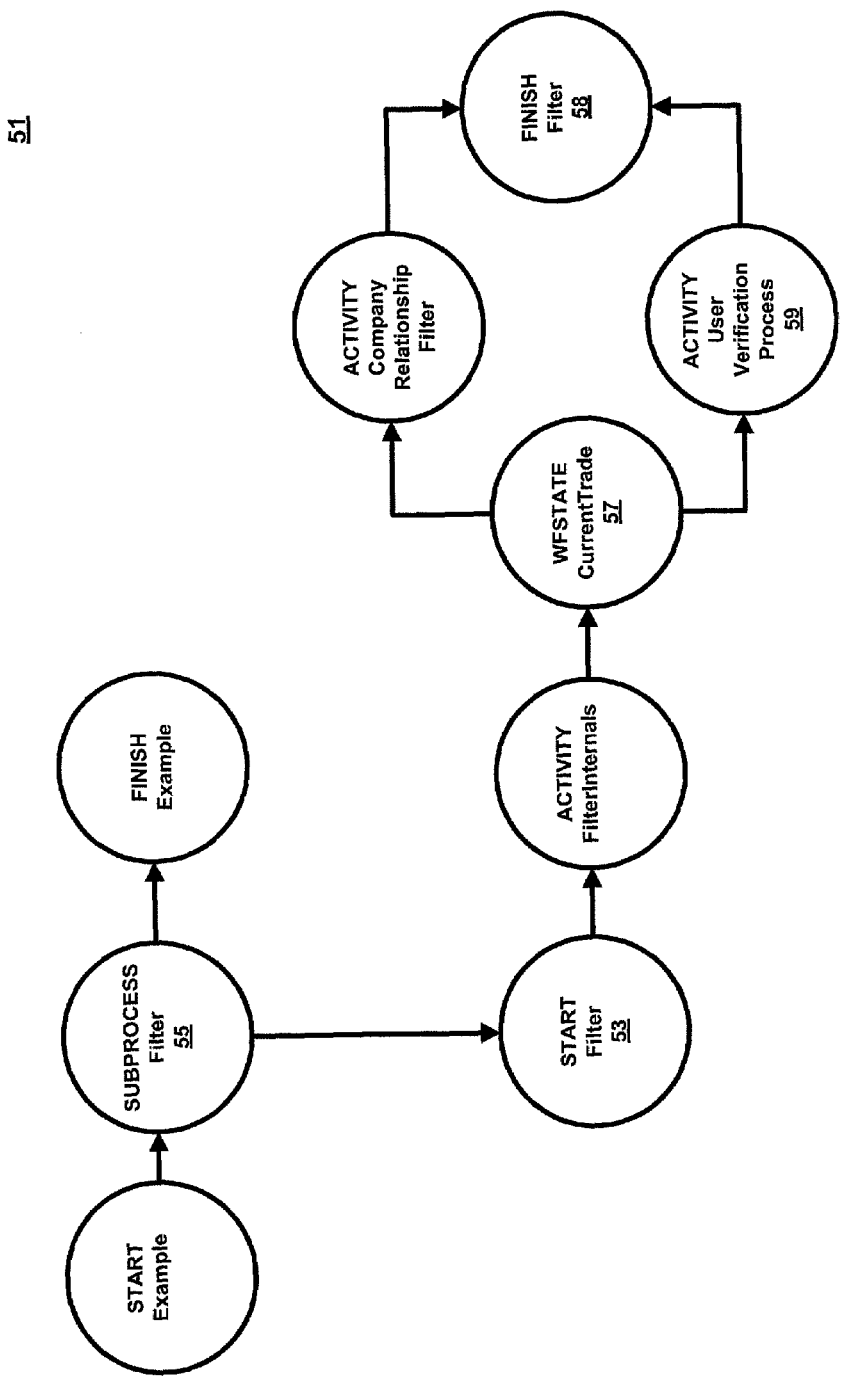
FIG. 5 is an example of an activity diagram corresponding to the transition table of FIG. 1.

Each transition line also includes a node number that identifies the particular transition line with a node in a corresponding activity diagram. For example, referring to FIG. 5, there is shown an activity diagram 51 according to an exemplary embodiment that corresponds to the transition table of FIG. 1. Activity diagram 51 includes a node 53 that corresponds to the first transition line 55 of the transition table in Table 1. The transition line is a START transition that indicates that it is the beginning of a workflow process. The transition line associated with node 53 has a data component that includes the purpose of the transition line—in this case to another workflow process that performs a filtering function. [The workflow process that performs the filtering function itself may invoke yet another workflow process and/or include a number of activities that together perform the desired filtering function.]. Finally, the transition line associated with node 53 includes a nextnode number that directs workflow engines 307 to the next node to be performed in the workflow process (and that corresponds to the associated activity diagram).

Transition lines may include other transition types. For example, the transition table includes a transition line that is corresponds to a node 55. This transition line is a SUBPROCESS transition line in which case the data portion of the transition line (in this case "filter") is a nested workflow process. Also, the transition line associated with node 55 is the second node in a second workflow route (here route 2). A node 57 (node 3 in route 1) is a WFSTATE transition line that indicates that a decision as to how the workflow is to proceed is to be made based on testing the value of various objects (for example a "CurrentTrade" object). A node 59 (node 5 in route 1) is an ACTIVITY transition line that indicates that the data portion of the transition line includes an activity (either a manual or automated activity) to be performed (in this case a "UserverificationProcess" activity). Finally, a node 58 (node 6 in route 1) is a FINISH transition line that indicates the end of a particular workflow route.

TABLE 1

| Route | Node | Transition | Data | Next Node |
|---|---|---|---|---|
| 1 | 1 | START | Filter | 2 |
| 1 | 2 | ACTIVITY | FilterInternals | 3 |
| 1 | 3 | WFSTATE | CurrentTrade.isValidToProcess() = True | 4 |
| 1 | 3 | WFSTATE | else | 5 |
| 1 | 4 | ACTIVITY | CompanyRelationshipFilter | 6 |
| 1 | 5 | ACTIVITY | UserVerificationProcess | 6 |
| 1 | 6 | FINISH | Filter | [NULL] |
| 2 | 1 | START | Example | 2 |
| 2 | 2 | SUBPROCESS | Filter | 3 |
| 2 | 3 | FINISH | Example | [NULL] |

While the example transition table listed in Table 1 is illustrative of a process description; the Load Balancing Mechanism of the present invention is not limited to this style of description. Furthermore, while the routing logic in this example is implemented via evaluation of the business objects referenced by the workflow packet, in an exemplary embodiment of the present invention the routing may also be determined in other manners, such as based directly upon the values returned by the activities.

Workflow database 303 also includes a work queue for storing activities that are to be performed in order to complete a particular workflow process. A will be described, each of activity servers 301 access the work queue contained in workflow database 303 for receiving work to be performed. In an exemplary embodiment, work to be performed is stored in workflow queue as workflow packets that include the type of activity to be performed as well as the process state (or context) associated with the particular item of work. Activity invocations are transitory in nature and do not maintain state relating to the workflow instance. Again, this is not a limitation of the resource management. For example, a workflow packet may detail that activity B (for e.g., an option pricing model) is to be performed using certain values for volatility, interest rate and underlying price as inputs. Based on this process state, an activity server that performs activity B will calculate the option model.

Each of activity servers 301 includes a resource manager 309 that is in communication with the workflow queue in workflow database 303 for receiving work to be performed. For example, resource manager 309(1) included in activity server 301(1) accesses the workflow queue to determine whether the workflow queue contains workflow packets awaiting activities that activity server 301(1) can perform. If such workflow packets are available, resource manager 309(1) may retrieve such workflow packets so that activity server 301(1) can perform the associated activities in the given context.

In an exemplary embodiment, resource manager 309 retrieves work from the workflow queue based on the results of transactions performed by the corresponding activity server 301. For example, resource manager 309(1) may retrieve from the workflow queue workflow packets that requires activities , A, B, C, D, E or F supported by activity server 301(1). In this way, resource manager 309(1) retrieves from workflow queue a sequence of workflow packets that can be performed by activity server 301(1) without having to repeatedly access the workflow queue to retrieve each workflow packet separately.

After any of activity servers 301 complete an activity and the next activity to be performed in the workflow process (as defined by the transitional information contained in the corresponding one of workflow engine 307) is to be performed by another of activity servers 301, the corresponding one of resource managers 309 forwards the workflow packet requiring the next activity to be performed as well as the process state under which the activity is to be performed. The corresponding one of resource manager 309 then stores the workflow packet in the workflow queue, assigning it to one of the plurality of other activity servers 301 that perform the particular activity can retrieve the workflow packet and perform the activity. For example, in the workflow example given above, after activity server 301(1) completes activity C, resource manager 309(1) first determines, by communicating with workflow engine 307(1), that the next activity to be performed is activity W. Resource manager 309(1) then forwards the workflow packet requiring activity W as well as the processing context required to perform activity W. Resource manager 309(1) then stores the workflow packet in the workflow queue so that activity server 301(2) that performs activity W can retrieve the workflow packet and perform the associated activity.

System 300 also includes an event receiver 311 in communications with workflow database 303 for initiating the execution of a particular workflow process. Event receiver 311 receives an event notification from an external system (not shown) requesting that a particular workflow process be executed. For example, a trading system may issue an event notification to event receiver 311 indicating that a trade has been executed and requesting that a settlement and confirmation workflow process be executed to process that trade. Similarly, event receiver 311 may receive event notifications from any number of other systems for initiating workflow processes to service the needs of those systems.

Upon receiving an event notification requesting that a particular workflow be executed, event receiver 311 causes the requested workflow process to be launched. A workflow packet is launched that contains only a reference to the event. The route(i.e. workflow process) that the packet is sent down is one of a plurality of routes described in the transition table. In an exemplary embodiment, the particular route is determined based on a mapping between different event types and particular workflow process that are responsive to that particular event type. The packet is then sent to one of activity servers 301 that performs the first activity included in the selected route.

Figure 4:
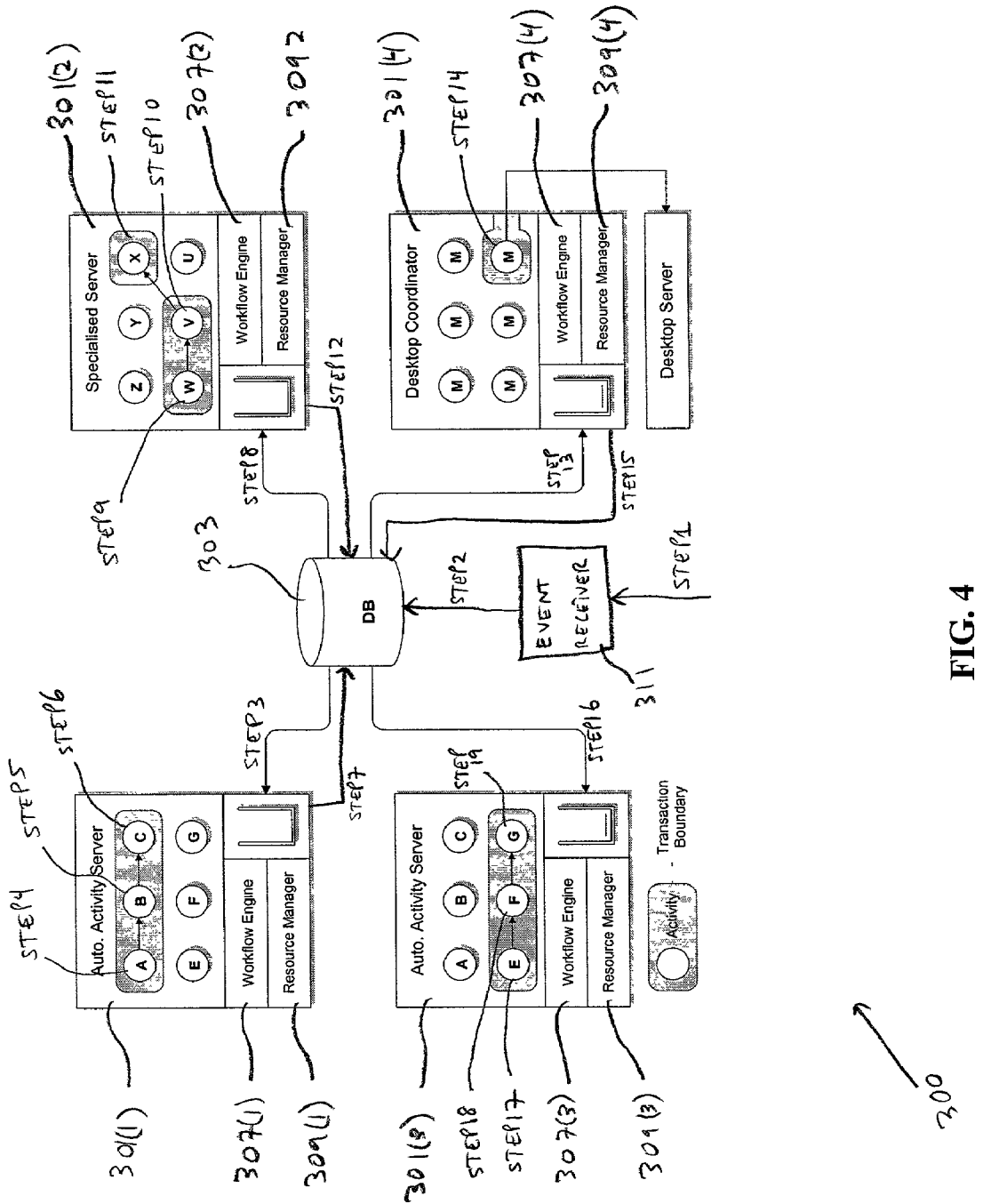
FIG. 4 is a flow diagram describing the execution of an exemplary workflow using the system of FIG. 3.

Referring now to FIG. 4, there is shown a flow diagram of system 300 executing an exemplary workflow. Initially, in Step 1, event receiver 311 receives an event notification directing system 300 to execute workflow (3). Next, in Step 2, event receiver 311 causes workflow (3) to be executed by the one of activity servers 301 providing the first activity to be found along the chosen route. Next, in Step 3, resource manager 309(1) of activity server 301(1) retrieves from the workflow queue stored in workflow database 303 a workflow packets that requires the execution of activity A—an activity that activity server 301(1) performs. Next, in Step 4, activity server 301(1) then executes activity A. Subsequently, activity server 301(1) examines the workflow transitional information contained in workflow engine 307(1) and determines that the next activity to be performed in the workflow process is activity B—another activity that activity server 301(1) performs. In Step 5, activity server 301(1) executes activity B. After activity server 301(1) executed activity B, it determines from the transitional information that the next activity to be performed is activity C and activity server 301(1) performs that activity In Step 6. Upon completion of these activities, it is determined by resource manager 309(1), based on the transitional information stored in workflow engine 307(1) that the next activity to be performed in the workflow process is activity W. Because activity server 301(1) does not perform activity W, resource manager 309(1) forwards the workflow packet that requires the activity W and any context information resulting from the execution of activities A, B and C. In Step 7, resource manager 309(1) stores this workflow packet W in the workflow queue, assigned to activity server 301(1).

Next, in Step 8, resource manager 309(2) associated with activity server 301(2) retrieves workflow packet W for execution by activity server 301(2). Upon execution of activity W in Step 9, activity server 301(2) determines that the next activity to be performed in the workflow process is activity V and activity server 301(2) executes activity V in Step 10. Activity server 301(2) determines that the next activity to be performed in the workflow process is activity X and activity server executes activity X in Step 11. Next, it is determined from the transitional information stored in workflow engine 307(2) that the next activity to be performed in the workflow process is activity M. Because activity server 301(2) does not perform activity M, resource manager 309(2) forwards the workflow packet that requires the activity M and any context information resulting from the execution of activities W, V and X. In Step 12, resource manager 309(2) stores this workflow packet M in the workflow queue.

Next, in Step 13, resource manager 309(4) associated with activity server 301(4) retrieves workflow packet M for execution by activity server 301(4). In this example, activity M is a manual activity in which activity server 301(4) receives input from a user. Upon receiving the requested input in Step 14, it is determined from the transitional information stored in workflow engine 307(4) that the next activity to be performed in the workflow process is activity E and resource manager 309(4) forwards the workflow packet that requires activity E and any context information resulting from the execution of activity M. In Step 15, resource manager 309(4) stores this workflow packet E in the workflow queue.

Next, in Step 16, resource manager 309(3) associated with activity server 301(3) retrieves workflow packet E for execution by activity server 301(3). Upon execution of activity E in Step 17, activity server 301(3) determines that the next activity to be performed in the workflow process is activity F and activity server 301(3) executes activity F in Step 18. Activity server 301(3) determines that the next activity to be performed in the workflow process is activity G and activity server executes activity G in Step 19. Next, it is determined from the transitional information stored in workflow engine 307(3) that no further transitions are available in the workflow route and therefore all the activities in the workflow process have been completed.

Accordingly, a method and system is provided for distributing workflow activities across multiple activity servers while overcoming the drawbacks of the prior art systems. In particular, because in the system of the present invention workflow activities may be replicated in different activity servers, performance bottlenecks caused by repeated access to commonly used activities is eliminated. Also, because infrequently used activities may be combined with commonly used activities in a particular activity server, system resources used to support the operation of activity servers can be efficiently managed. In addition, because all the manual activities that involve user interaction can be performed by a single activity server, the other activity servers are freed from idly waiting for a user response to a manual activity information request. Furthermore, because each activity server includes a workflow engine that stores the transitional information for the workflow to be performed, the activity servers of the system of the present invention can seamlessly forward requests for activities to be performed to those activity servers capable of fulfilling such requests. Finally, because any number of activity servers may be included in the system and each activity server includes a resource manager for retrieving work to be performed by the corresponding activity server, the system of the present invention eliminates most of the single points of failure associated with the prior art systems.

In summary, the benefits of the load balancing method of the present invention include:

enabling the serial processing of a workflow packet by a plurality of activities within a single transaction upon a single activity server;

enabling a single workflow packet to be serially processed by a plurality of activities distributed across a plurality of activity servers(with at least one of a possible plurality of transactions occurring per server before the workflow packet is passed to another of the plurality of activity servers);

enabling the concurrent processing of a plurality of workflow packets by a plurality of activities upon a plurality of activity servers, with only one of the activities being performed at a time upon each of the plurality of activity servers;

enabling the forward distribution of a plurality of workflow packets to a plurality of activity servers thus avoiding the situation in which a plurality of activity servers compete for workflow packets and thereby avoiding significant contention for workflow packets;

enabling each of the plurality of activity servers to distribute a workflow packet to other activity servers if the next required activity is not available locally; and facilitating the simple configuration of any of the plurality of activity servers to provide any subset of the plurality of activities.

A number of embodiments of the present invention have been described. Nevertheless, it will be understood that various modifications may be made without departing from the spirit and scope of the invention. Based on the above description, it will be obvious to one of ordinary skill to implement the system and methods of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distributing modules and/or data in a different fashion will be apparent to those skilled in the art and are also within the scope of the invention. In addition, it will be obvious to one of ordinary skill to use a conventional database management system such as, by way of non-limiting example, Sybase, Oracle and DB2, as a platform for implementing the present invention. Also, network access devices can comprise a personal computer executing an operating system such as Microsoft Windows™, Unix™, or Apple Mac OS™, as well as software applications, such as a JAVA program or a web browser. Network access devices 203-205 can also be a terminal device, a palm-type computer, mobile WEB access device or other device that can adhere to a point-to-point or network communication protocol such as the Internet protocol. Computers and network access devices can include a processor, RAM and/or ROM memory, a display capability, an input device and hard disk or other relatively permanent storage. Accordingly, other embodiments are within the scope of the following claims.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

The invention claimed is:

1. An automated method for processing a workflow among a plurality of activity servers, the method comprising, at each activity server among the plurality of activity servers, the steps of:
   obtaining workflow transition information from a common database, the workflow transition information defining a sequence of a plurality of activities for a workflow;
   retrieving a workflow packet from a workflow queue maintained in the common database, the workflow packet corresponding to an activity defined in the sequence of activities for the workflow;
   performing the activity corresponding to the retrieved workflow packet;
   determining a next activity in the sequence of activities for the workflow from the workflow transition information;
   wherein the next activity is capable of being performed by the activity server, performing the next activity without requesting a next workflow packet from the workflow queue; and
   wherein the next activity is incapable of being performed by the activity server, forming the next workflow packet corresponding to the next activity and forwarding the next workflow packet to the workflow queue for retrieval by another activity server capable of performing the next activity.

2. The method of claim 1, wherein said workflow packet includes a process state.

3. The method of claim 1, wherein at least one of said plurality of activity servers performs more than one of said plurality of activities.

4. The method of claim 1, wherein at least one of said plurality of activities is an automatic activity.

5. The method of claim 1, wherein at least one of said plurality of activities is a manual activity for receiving a user input.

6. The method of claim 5, wherein said manual activity manages a user interface.

7. The method of claim 1, wherein more than one of said plurality of activities is a manual activity and said more than one of said plurality of activities are aggregated in one of said plurality of activity servers.

8. The method of claim 7, wherein said one of said plurality of activity servers interfaces with a desktop server for providing a user interface to a user.

9. The method of claim 1, wherein at least one of said plurality of activities is performed by more than one of said plurality of activity servers.

10. The method of claim 1, further comprising the steps of:
    receiving an event notification requesting that said workflow be processed; and
    initiating said workflow in response to the event notification.

11. The method of claim 1, wherein said workflow transition information includes a routing transition.

12. The method of claim 11, further comprising the step of:
    performing more than one of said plurality of activities and more than one routing transition in a single transaction in one of said plurality of activity servers.

13. The method of claim 1, wherein said workflow transition information includes a route number, a node number, a routing transition and a next node number.

14. An automated system for processing a workflow comprising:
    a plurality of activity servers obtaining workflow transition information from a common database, the workflow transition information defining a sequence of a plurality of activities for a workflow;
    each of the plurality of activity servers executing instructions to:
       retrieve a workflow packet from a workflow queue maintained in the common database, the workflow packet corresponding to an activity defined in the sequence of activities for the workflow;
       perform the activity corresponding to the retrieved workflow packet;
       determine a next activity in the sequence of activities for the workflow from the workflow transition information;

wherein the next activity is capable of being performed by the activity server, performing the next activity without requesting a next workflow packet from the workflow queue; and wherein the next activity is incapable of being performed by the activity server, forming the next workflow packet corresponding to the next activity and forwarding the next workflow packet to the workflow queue for retrieval by another activity server capable of performing the next activity.

15. The system of claim 14, wherein said workflow packet includes a process state.

16. The system of claim 14, wherein at least one of said plurality of activity servers performs more than one of said plurality of activities.

17. The system of claim 14, wherein at least one of said plurality of activities is an automatic activity.

18. The system of claim 14, wherein at least one of said plurality of activities is a manual activity for receiving an input from a user.

19. The system of claim 18, wherein said manual activity manages a user interface.

20. The system of claim 14, wherein more than one of said plurality of activities is a manual activity and said more than one of said plurality of activities are aggregated in one of said plurality of activity servers.

21. The system of claim 20, wherein said one of said plurality of activity servers interfaces with a desktop server for providing a user interface to a user.

22. The method of claim 14, wherein at least one of said plurality of activities is performed by more than one of said plurality of activity servers.

23. The system of claim 14, further comprising an event receiver, said event receiver receiving an event notification for initiating said workflow.

24. The system of claim 14, wherein said workflow transition information includes a route number, a node number, a routing transition and a next node number.

25. Computer executable program code residing on a computer-readable medium for processing a workflow by a plurality of activity servers, the program code comprising instructions being operable to cause each of the plurality of activity servers to:

obtain workflow transition information from a common database, the workflow transition information defining a sequence of a plurality of activities for a workflow;

retrieve a workflow packet from a workflow queue maintained in the common database, the workflow packet corresponding to an activity defined in the sequence of activities for the workflow;

perform the activity corresponding to the retrieved workflow packet;

determine a next activity in the sequence of activities for the workflow from the workflow transition information;

wherein the next activity is capable of being performed by the activity server, perform the next activity without requesting a next workflow packet from the workflow queue wherein the next activity is incapable of being performed by the activity server, form the next workflow packet corresponding to the next activity and forward the next workflow packet to the workflow queue for retrieval by another activity server capable of performing the next activity.

26. The program code of claim 25, wherein said workflow packet includes a process state.

27. The program code of claim 25, wherein at least one of said plurality of activities is an automatic activity.

28. The program code of claim 25, wherein at least one of said plurality of activities is a manual activity for receiving a user input.

29. The program code of claim 28, wherein said manual activity manages a user interface.

30. The program code of claim 25, wherein more than one of said plurality of activities is a manual activity and said more than one of said plurality of activities are aggregated in one of said plurality of activity servers.

31. The program code of claim 25, wherein at least one of said plurality of activities is performed by more than one of said plurality of activity servers.

32. The program code of claim 25, further comprising instructions to:

receive an event notification requesting that said workflow be processed; and initiate said workflow in response to the event notification.

33. The program code of claim 25, wherein said workflow transition information includes a routing transition.

34. The program code of claim 33, further comprising instructions to:

perform more than one of said plurality of activities and more than one routing transition in a single transaction in one of said plurality of activity servers.

35. The program code of claim 25, wherein said workflow transition information includes a route number, a node number, a routing transition and a next node number.

* * * * *

UNITED STATES PATENT AND TRADEMARK OFFICE
CERTIFICATE OF CORRECTION

| | | |
|---|---|---|
| PATENT NO. | : 7,657,590 B2 | Page 1 of 1 |
| APPLICATION NO. | : 10/055100 | |
| DATED | : February 2, 2010 | |
| INVENTOR(S) | : Reading et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1145 days.

Signed and Sealed this

Twenty-eighth Day of December, 2010

David J. Kappos
*Director of the United States Patent and Trademark Office*